Patented Jan. 3, 1950

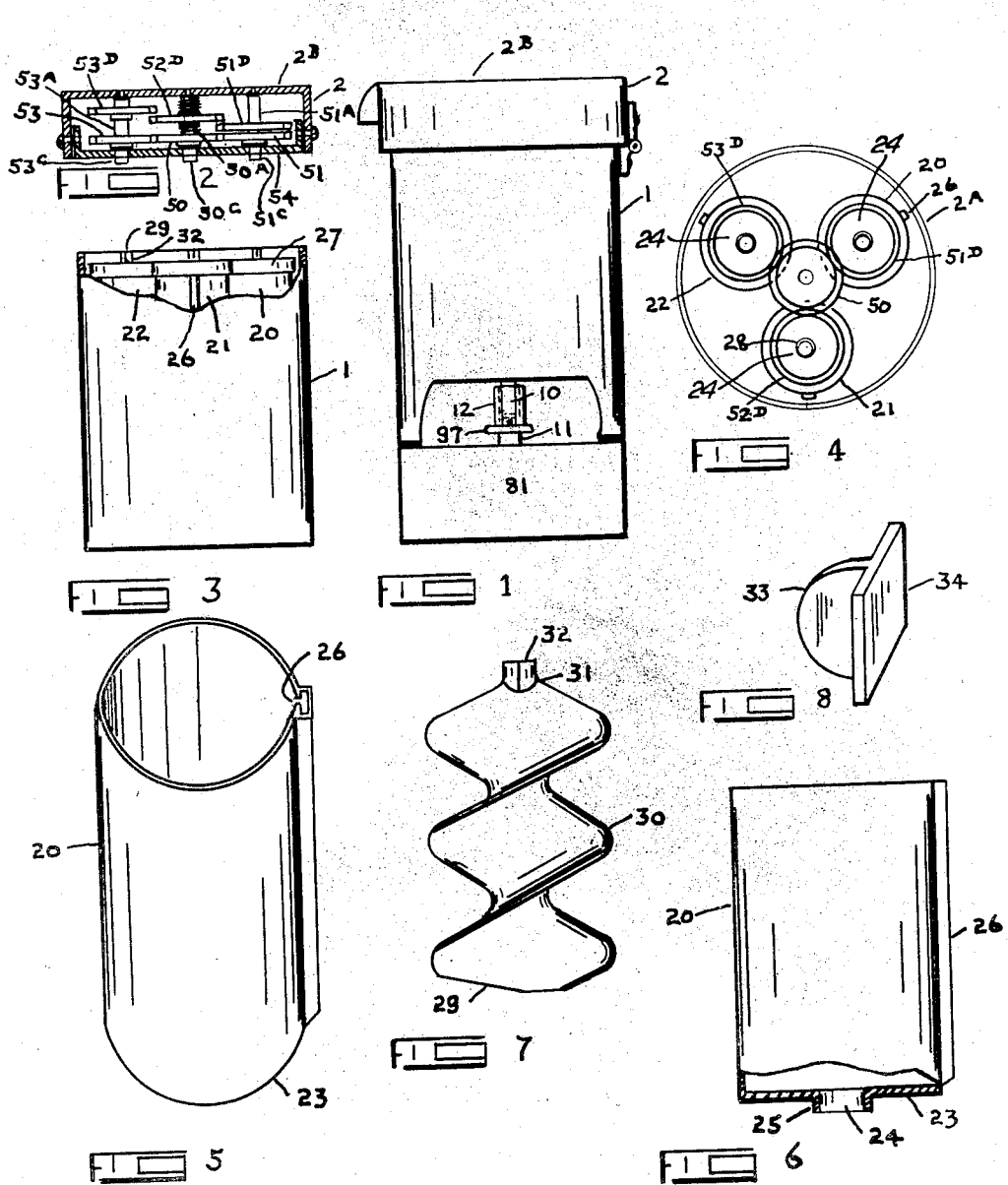

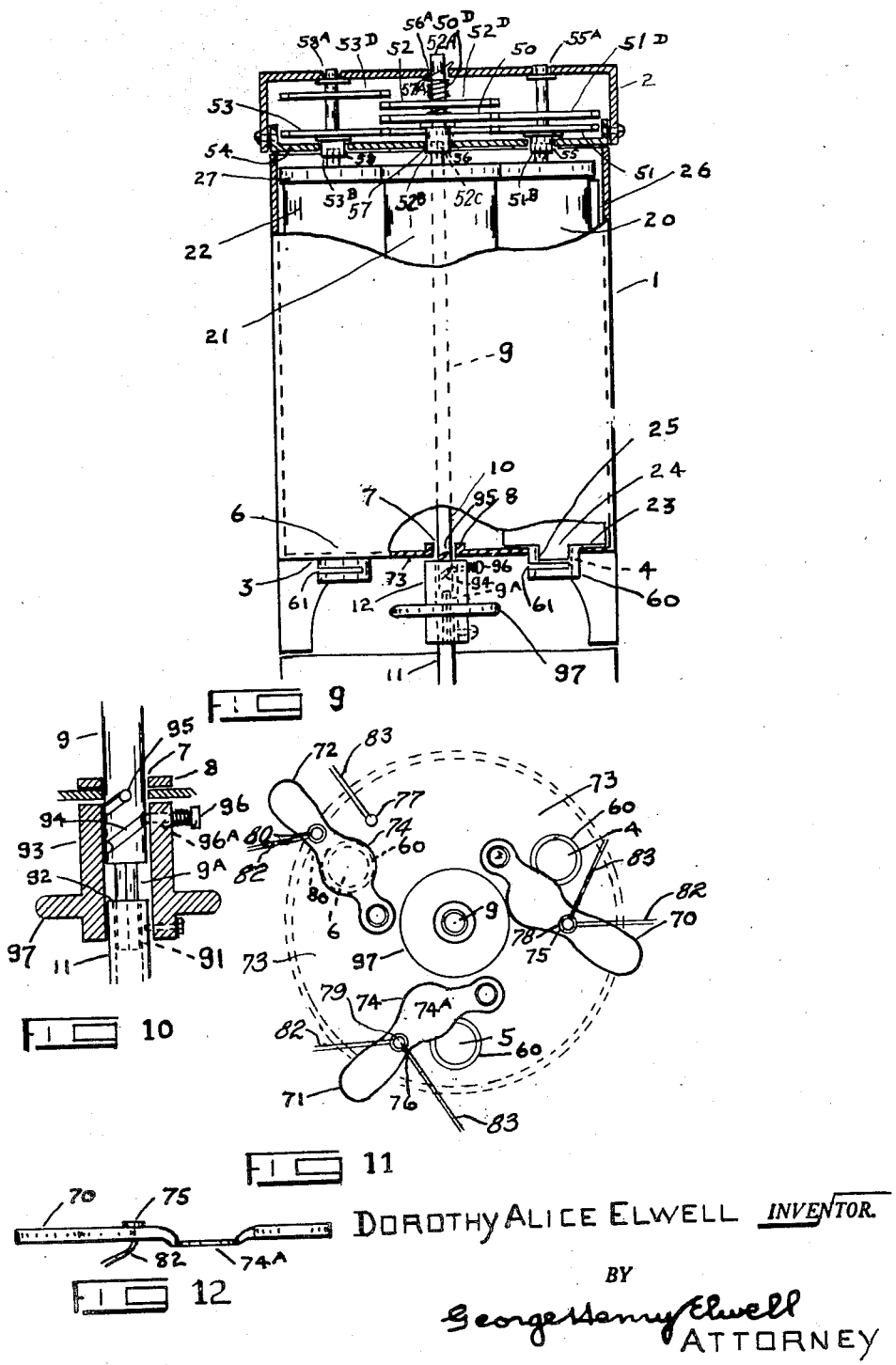

2,493,395

UNITED STATES PATENT OFFICE 2,493,395

ICE-CREAM MAKER AND DISPENSER

Dorothy Alice Elwell, Boston, Mass.

Application November 28, 1945, Serial No. 631,356

3 Claims. (Cl. 259—43)

This invention relates to ice-cream makers and dispensers and more particularly to such a mechanical dispenser of ice-cream that positively eliminates human contact with the frozen content in serving quantities of the same for consumption in plates or other receptacle.

It appears to be a common practice by concerns who supply ice-cream, to deliver large quantities to drug and other stores within containers that are placed in refrigerated cabinets and manually dispensed therefrom by clerks who scoop-up small quantities which often requires that they extend hairy arms within a container. More than likely, extraneous matter is inclined to cling to hairy arms and threaten to fall in and to become mixed with the content of a container during such manual process of dispensing. It is this unsanitary condition in the present manner of handling ice-cream that this invention makes possible to correct.

The objects of the invention therefore are to provide means whereby the dispensing of ice-cream may be made sanitary; and to provide mechanical means whereby, if desired, ice-cream may be made and dispensed from one and the same container without human contact with its content.

With reference to the accompanying drawings, the Figure 1 is a side elevation of the device omitting at its bottom certain levers and outlets; Figure 2 is a cross-sectional front view of the cover of the device, illustrating therein one position of gearing; Figure 3 is a front elevation of casing, in part, illustrating through the broken wall thereof top portions of each of three containers with a key end of a shaft projecting through covers of each; Figure 4 is a top view through the circular rim of the casing cover, illustrating in outline a top view of covered containers and arrangement of gearing; Figure 5 is an upright side view, in perspective, of one of the containers; Figure 6 is a side elevation of a container, illustrating through a broken wall a container outlet; Figure 7 is an upright elevation of an agitator having a central shaft carrying therearound a continuous spiral blade; Figure 8 is a perspective view of a spade pusher element; Figure 9 is a front elevation of the device, partly in cross-section, illustrating another position of gearing within the casing cover and connected key seats of gearing with key ends of central shaft and shafts projecting through container covers; and further illustrating certain casing outlets registered with outlets of containers; and still further illustrating, in part, the central shaft of the casing provided with manual means for raising and lowering the same, certain levers being omitted; Figure 10 is an enlarged elevation of said raising and lowering means; Figure 11 is a plan view of the circular bottom of the casing, illustrating relative positions of outlets, each provided with a manually operable lever carrying a closure-cutter means, and locations of movable and fixed contacts; and Figure 12 is an enlarged side view of one of the closure-cutter levers.

With more particular reference to the accompanying drawings, the numeral 1 designates the casing of the device having at its top the hinged cover 2 and at and through the bottom 3 the triangularly spaced dispensing outlets 4, 5 and 6 and a central opening 7 provided with a bearing 8 for the rotatable and sliding central shaft 9 extending therethrough, the lower extremity of the shaft 9 being provided with a key formation 9A, to be explained, and the lower extremity 10 having connection with a motor shaft 11 through the medium of a lifting and lowering manually operable means 12.

The numerals 20, 21 and 22 designate containers adapted to be placed within the casing 1. At the bottom 23 of each container 20, 21 and 22 there is provided, eccentric to the axis of the casing 1, a dispenser outlet 24, each having a downwardly extending flange 25 adapted to fit snugly within one of registering outlets 4, 5 or 6 of the casing bottom, and each container 20, 21 and 22 is provided with a cover 27 having a central bearing opening 28 therethrough. In the wall of each container 20, 21 and 22 there is provided, open to the interior thereof, a groove run 26 exteriorly extending the entire distance from the cover 27 to the bottom 23.

A rotatable agitator 29 of spiral surface blade formation having convolutions 30 is adapted to closely rotatingly engage, one within each of the containers 20, 21 and 22, and resting upon the bottom thereof. At the top extremity of each agitator 29 there is integrally provided a central upwardly extending shaft 31 adapted to project through the opening 28 of a cover 27, thus serving to maintain an even and erect position of the agitator 29 within its container. The projecting extremity of each shaft 31 is provided with a key formation 32. A sliding spade pusher 33 is provided in one plane with a T-sliding base 34 in a transverse plane thereto for engagement within the groove run 26 of a container 20, 21 or 22, the spade-pusher 33 fitting snugly between two adjacent convolutions 30 of the spiral agitator 29.

The rotatable and sliding central gear 50 and the surrounding gears 51, 52 and 53 are respectively mounted on shafts 50A, 51A, 52A and 53A within bearings provided by the cover top 2B of the hinged cover 2, and corresponding bearings provided in the face plate 54 secured to the cover rim 2A, the plate bearings being identified as 55, 56, 57 and 58 therein, with corresponding bearings 55A, 56A, 57A and 58A provided in the cover top 2B. The central gear 50 has an upward axially sliding movement upon the gear shaft 50A, but is maintained spring-pressed in its lowest position by means of the coil spring 50D. The gears 51, 52 and 53 are maintained in a common plane and normally in mesh with the central gear 50 in its lowest position. Integral with each of the gears 51, 52 and 53 there is carried in elevated planes therefrom a gear 51D, 52D and 53D, respectively, of identical centers and diameters but elevated in different planes, each one from the others, in step sequence; the gear 51D being in an elevated plane once removed, as it were, from its supporting gear 51, the gear 52D being elevated twice that distance from its supporting gear 52, and gear 53D being elevated thrice that distance from its supporting gear 53.

The under end surfaces 50B, 51B, 52B and 53B of each of the gear shafts 50A, 51A, 52A and 53A projecting below the face plate 54 are provided with key seats 50C, 51C, 52C and 53C, respectively, adapted to receive their respective key formations 9A of the central shaft 9 and key formations 32 of the shafts 31, upon the closing down of the cover 2 upon the casing 1.

The dispensing outlets 4, 5 and 6 of the casing 1 are each provided with a downwardly extending flange 60 having a transverse recess 61 extending nearly through the flange 60, a flange of a container 20, 21 or 22 being adapted to be removably inserted within the flange 60 to an extent only to above said recess 61, which should remain unobstructed thereby.

Levers 70, 71 and 72 are each pivotally secured to the under surface 73 of the bottom 3 of the casing 1 so that in one position each extends on one side of a dispenser outlet 4, 5 or 6. Carried by each of the levers 70, 71 and 72 is a closure-cutter element 74 adapted to fit snugly within the recess 61 of the flange 60 of the dispenser outlet 4, 5 or 6, and thus adapted to provide a closure to the registering outlets 24.

The upper surface of each of the levers 70, 71 and 72 carries an electrical contact 75, 76 or 77 for engagement with a fixed contact 78, 79 or 80, respectively, secured in the under surface 73 of the bottom 3 of the casing 1. These contacts are wired (wire shown only in part) as at 82 and 83 with a source of electrical power (not illustrated) operating a motor (not illustrated) within a box 81, the engagement of any pair of contacts 75—78, 76—79, or 77—80 being adapted to start the motor (not illustrated), the motor shaft 11 and the central shaft 9, connected with the shaft 11.

The connection of the motor shaft 11 with the central shaft 9 is provided by a key extension 9A of the central shaft lower extremity slidingly inserted within an elongated key seat 91 with which the upper extremity 92 of the motor shaft 11 is provided. Fixed to the motor shaft 11 adjacent the extremity 92 is a connector sleeve element 93 adapted to accommodate therein the full diameter of the central shaft 9. That part of the central shaft 9 within the sleeve 93 is provided with a spiral groove 94 within its cylindrical surface, such groove 94 being provided therein with spaced recesses 95. An inwardly spring-pressed pin 96 within a transverse bore 96A with which the upper portion of the sleeve 93 is provided, is adapted to travel within said groove 94 and ride into and out of the said recesses 95 as the motor shaft 11 carrying the sleeve 93 is turned over relative to the central shaft 9. A wheel 97 carried by the sleeve 93 provides a convenient means for manually turning over said motor shaft 11.

That part of the casing interior not occupied by the central shaft 9 the containers 20, 21 and 22 and covers 27, is available for any desired system of refrigeration (not illustrated) within the casing 1.

While a motor and transmission of power are necessary to the operation of the device herein described, the particular means of operation is not a feature of the improved ice cream maker and dispenser upon which patentability herein sought depends. However such a motor must have two speeds, one of which must be transmitted to the central shaft 9 as very slow.

In operation for the making and dispensing of ice cream, the mixture therefor is placed in any one or all three of the containers 20, 21 and 22, first properly placing the containers 20, 21 and 22 within the casing 1 with flanges 25 of outlets 24 fitting within the dispenser outlets 4, 5 and 6, respectively, of the casing 1, and with each cutter-closure 74 in closed position within the recesses 61 of the flanges 60. With the spiral agitators 29 within each of the containers 20, 21 and 22 and the container covers 27 in place with each of the three agitator shafts 31 projecting up through the cover bearing opening 28, the cover 2 of the casing 1 may be closed, care being taken that each key seat 50C, 51C, 52C and 53C of the several gear shafts 50A, 51A, 52A and 53A receives therein the upper key extremity of the central shaft 9 and the three upper key extremities 32 of the agitator shafts 31, respectively. The motor shaft 11 and the central shaft 9 of the device being in readiness for rotation in a clockwise direction; the gears 50, 51, 52 and 53 being in mesh, as illustrated by the figure 2, and the agitators 29 within each of the fixed containers 20, 21, and 22, the motor may be started so that each of the spiral convolutions 30 will agitate the mixture contents with a downwardly directed tendency within each of the containers 20, 21 and 22.

The content of each container 20, 21 and 22 becoming frozen, the motor may be stopped and, the cover 2 of the casing 1 being lifted, as well as the several covers 27 of the containers 20, 21 and 22, a pusher spade 33 may then be inserted within each container 20, 21 and 22 with the T-portion thereof slidingly entered within the groove 26 so that the pusher spade 33 projects therefrom radially between two of the convolutions 30, there fitting closely to the spiral surface of the agitator 29.

The cover 2 being closed again, and the key gear shaft seats aforesaid covering the key extremities as already explained, the wheel 97 may be then rotated to turn over the motor shaft 11 and thereby force the pin 96 to travel the spiral groove 94, first vacating the recess 95, to enter the next higher recess 95, this operation lifting the central shaft 9 and hence the central gear 50, placing the gear 50 out of mesh with the three gears 51, 52 and 53 and into mesh with the elevated gear 51D, as illustrated by the Figure 9.

With the central gear 50 in mesh with the elevated gear 51D, as just been stated, it may be assumed that each container 20, 21, and 22 contains a frozen mixture of different flavors and that a patron has ordered a portion of the flavor contained in container 20. The operator, to supply such order, swings to the left that particular lever 70 which is beneath the dispensing outlet 4 of the container 20. The swinging of that lever 70 withdraws the cutter blade 74A of the closure-cutter 74 from within its recess 61, thus opening the dispenser outlet 4 of the casing 1, the dispensing outlet 24 of the container 20 being permanently open unless plugged up as hereinafter explained. That same swinging action of the lever 70 to the left not only opens the outlet 4 but simultaneously operates the motor (not illustrated) as the contact 75 carried by the lever 70 engages the fixed contact 78 to open the motor circuit. It is assumed that, at this point of the process, the transmission of power of the motor (not illustrated) is set at a very low speed so as to operate the motor shaft 11 and the central shaft 9 at a little higher rate of speed substantially equal only to the movement of the minute hand of a clock, but in a contra-clockwise direction. This slow rotation of the shaft 11 gives to the central shaft 9, and hence to the spiral agitator 29, a movement which, if the frozen content is not too hard, will have a tendency to force the content very slowly downward but, if the content is so hard as to be substantially carried in a compact mass by the spiral agitator with no movement downward, the content will be forced downwardly along the spiral formation of the agitator 29 as its advance contacts the content with the spade pusher 33 which, in effect, continuously pushes the frozen content as the spade pusher 33 is made to follow on by means of the rotation of the spiral formation of the agitator 29 compelling the base 34 to slide downwardly within the groove run 26. The downward pressure of said content causes the frozen mixture to be delivered to and through the registering flanges 25—60 of the cutter-closure 74 in cylindrical form into a waiting individual plate, the thickness of such a block of ice cream being determined by the operator as he reverses the swinging movement of the lever 70 and thereby plunges the cutter-closure 74 within the recess 61. Such reverse movement of the lever 70 stops the running of the motor (not illustrated) by disconnecting the contact 75 carried by the lever 70 from off the fixed contact 78 secured to the bottom 3 of the casing 1, thus leaving the apparatus in readiness for further selective operations of the wheel 97 and of either of the other two levers 71—72 to dispense, in the manner above set forth, portions of the contents of the other containers 21 and 22.

While the applicant has above described one form of her invention, she does not limit the invention to that as set forth; for changes in form and combinations of elements producing an ice cream maker and dispenser which eliminates human contact, after once the mixture enters the containers for freezing, is intended to be included within the patent protection hereby sought. For instance, a manufacturer of ice cream might use containers of substantially the type of those of 20, 21 and 22 in which to make ice cream by his own process without the use of the casing 1 therefor (casings of the type herein disclosed being in the hands of drug stores, ice cream parlors and the like), the full containers, with the spiral member 29 and spade member 33 in each being delivered to such stores etc. to be placed within a casing 1 and dispensed therefrom in the manner above described. Under such an arrangement, each container outlet 24 would temporarily be provided with a plug which could be removed before placing the container within the casing 1. Such plug (not illustrated) may be made of wood.

The mere dispensing of ice cream in the manner just above described would eliminate human contact where sanitary practices are most needed under surveillance of the public.

I claim:

1. A maker and dispenser of ice-cream including a container having a cylindrical wall; a groove provided by, and extending axially within, said wall; an agitator within said container and relatively rotatable therewith upon a common axis, said agitator comprising an axially extending shaft having an end seated upon the bottom of said container, the said shaft supporting throughout its length convolutions of a spiral platform blade substantially reaching across the inside diameter of said container; an upright pusher blade positioned within said container upon one side of said shaft between any two of said convolutions, the pusher blade having a base portion supported by, and slidable within said groove; an outlet having a removable closure provided by said container bottom for dispensing therethrough of a content of ice-cream conveyed to said outlet down the spiral platform by the downwardly sliding pusher blade carried axially between convolutions on said rotatable movement; and means adapted to provide said rotatable movement.

2. A maker and dispenser of ice-cream including a fixed container having a cylindrical wall; a groove provided by, and extending axially within, said wall; a rotatable agitator within said container, said agitator comprising an axially extending shaft having an end seated upon the bottom of said container, the said shaft supporting throughout its length convolutions of a spiral platform blade substantially reaching across the inside diameter of said container; an upright pusher blade positioned within the container upon one side of said shaft between any two of said convolutions, the pusher blade having a base portion supported by, and slidable within, said groove; an outlet having a removable closure provided by said container bottom for dispensing therethrough a content of ice-cream conveyed to said outet down the spiral platform by the downwardly sliding pusher blade carried axially between convolutions on said rotatable movement of said shaft; and means adapted to rotate said shaft.

3. An agitator for a container of an ice-cream mixture, said agitator comprising an upright shaft having an end rotatably seated upon the bottom of the container; a continuous spiral platform blade supported and carried by said shaft, the convolutions of said blade substantially reaching across the inside diameter of the container; a compressor blade movably supported in a groove provided by said container parallel to said shaft, said blade being positioned between certain of said convolutions; and means adapted to rotate said shaft.

DOROTHY ALICE ELWELL.

REFERENCES CITED

The following references are of record in the file of this patent:

UNITED STATES PATENTS

| Number | Name | Date |
| --- | --- | --- |
| 354,934 | Raymond | Dec. 28, 1886 |
| 1,011,828 | Lowenthal | Dec. 12, 1911 |
| 1,386,280 | Schneider | Aug. 2, 1921 |
| 1,766,172 | Hiles | June 24, 1930 |
| 1,873,407 | Holland | Aug. 23, 1932 |
| 2,207,884 | Holman | July 16, 1940 |

FOREIGN PATENTS

| Number | Country | Date |
| --- | --- | --- |
| 248,656 | Great Britain | Mar. 11, 1926 |